(12) United States Patent
Wu et al.

(10) Patent No.: US 11,448,818 B2
(45) Date of Patent: Sep. 20, 2022

(54) RING LIGHT GUIDE AND LIGHT SOURCE MODULE

(71) Applicant: Qisda Corporation, Taoyuan (TW)

(72) Inventors: Chi-Chun Wu, Taoyuan (TW);
Chiao-Yun Chung, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 17/364,104

(22) Filed: Jun. 30, 2021

(65) Prior Publication Data

US 2022/0026622 A1 Jan. 27, 2022

(30) Foreign Application Priority Data

Jul. 23, 2020 (CN) .......................... 202010715764.4

(51) Int. Cl.
*F21V 8/00* (2006.01)
*F21S 43/245* (2018.01)
*B60Q 3/00* (2017.01)
*G03B 15/05* (2021.01)

(52) U.S. Cl.
CPC ......... *G02B 6/0061* (2013.01); *G02B 6/0035* (2013.01); *G02B 6/0046* (2013.01); *G02B 6/0051* (2013.01); *G02B 6/0055* (2013.01); *B60K 2370/336* (2019.05); *B60Q 3/00* (2013.01); *F21S 43/245* (2018.01); *G03B 15/05* (2013.01)

(58) Field of Classification Search
CPC ...... F21S 43/245; G02B 6/0061; G03B 15/05
See application file for complete search history.

(56) References Cited

U.S. PATENT DOCUMENTS

2010/0315816 A1\* 12/2010 Madelin ................. G03B 17/56
362/296.01
2019/0063730 A1\* 2/2019 O'Brien .................... F21K 9/68

FOREIGN PATENT DOCUMENTS

| CN | 209130622 U | | 7/2019 |
| CN | 209295035 U | | 8/2019 |
| CN | 210323449 U | \* | 4/2020 |
| TW | 201542975 A | | 11/2015 |

\* cited by examiner

*Primary Examiner* — Keith G. Delahoussaye

(57) ABSTRACT

A light source module includes a ring light guide, at least one light source, a reflector, and a diffuser. The ring light guide includes a ring body and at least one light incident portion. The ring light guide has a light exit surface and a bottom surface, which are two opposite ring surfaces of the ring body. The ring body has a plurality of optical structures disposed along the ring body. The at least one light incident portion is disposed on the ring body and protrudes from a lateral side of the ring body. The light incident portion has a light incident surface, wherein a plane where the light incident surface lies crosses a plane where the light exit surface lies.

7 Claims, 9 Drawing Sheets

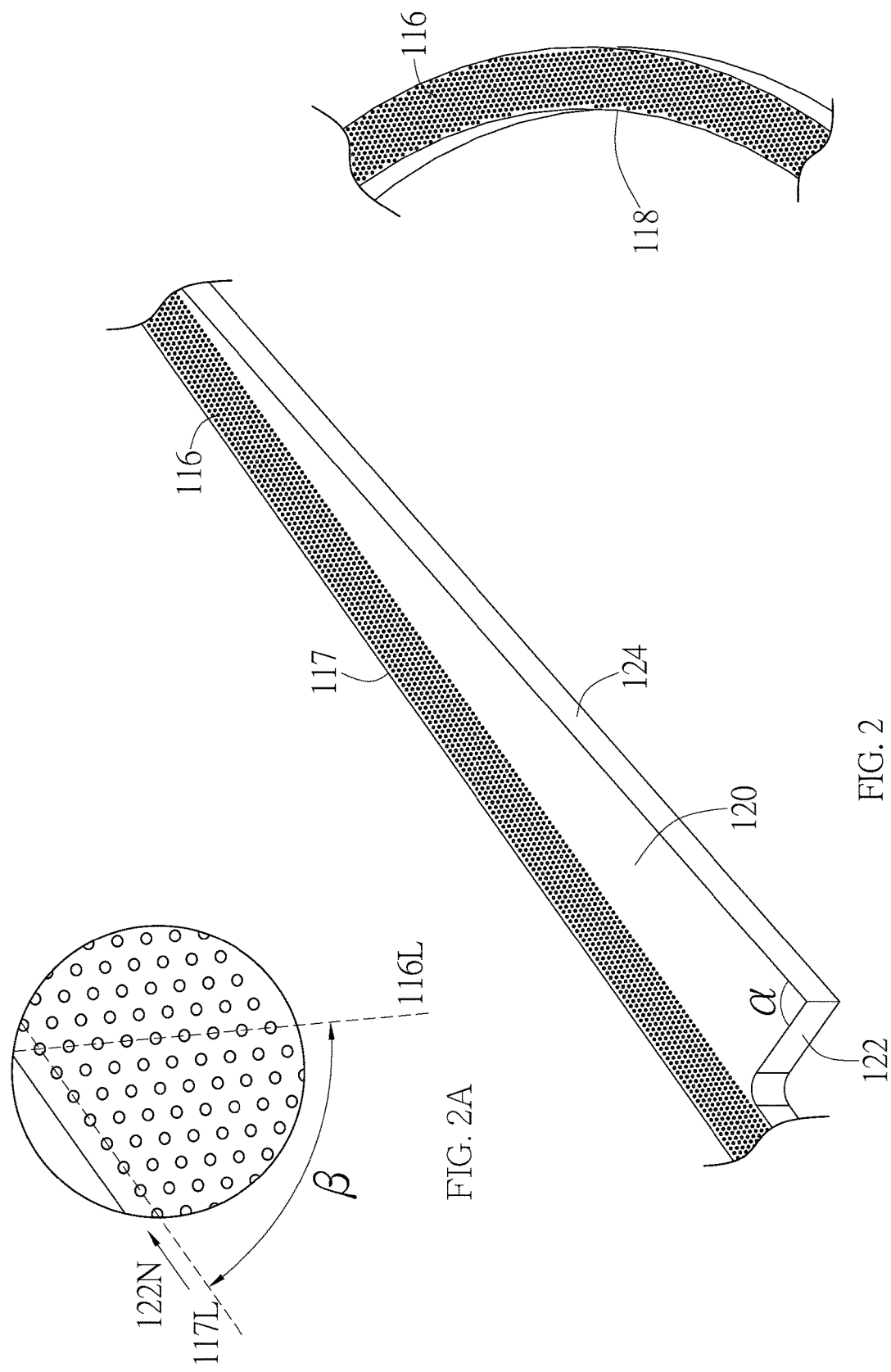

RING LIGHT GUIDE AND LIGHT SOURCE MODULE

BACKGROUND OF THE INVENTION

1. Field of the Invention

The invention generally relates to a ring light guide and a light source module. Particularly, the invention relates to a ring light guide and a light source module with a light incident direction corresponding to the extension direction of the ring light guide.

2. Description of the Prior Art

In pursuit of innovation and beauty for the appearance of products, ring lights are increasingly developed recently. In order to achieve ring lights, one of the existing light-emitting mechanisms is to use multiple light emitting diodes (LEDs) emitting light in the forward direction, or to use a flexible light bar bent into a specific shape.

However, for the multiple LEDs approach, in order to avoid the uneven brightness of light source on the appearance, a large amount of LEDs should be evenly arranged along the ring, so the cost is relatively high. For the flexible light bar approach, the ring-shaped appearance will have a relatively dark area in the joint area of the light bar, which cannot meet the needs of users as the requirements for the appearance of products are increasingly refined.

SUMMARY OF THE INVENTION

It is an object of the invention to provide a ring light guide, which has a light incident portion with a light incident surface disposed corresponding to the extension direction of the ring body, so a limited amount of light sources can be used to achieve the uniform distribution of brightness with effective cost.

In an embodiment, the invention provides a ring light guide including a ring body and at least one light incident portion disposed on the ring body, the ring body having a light exit surface and a bottom surface, the light exit surface and the bottom surface being two opposite ring surfaces of the ring body, the ring body having a plurality of optical structures disposed along the ring body, the light incident portion protruding from a lateral side of the ring body and having a light incident surface, wherein a plane where the light incident surface lies crosses a plane where the light exit surface lies.

In an embodiment, the plurality of optical structures has a distribution density increasing from the light incident surface along an extension direction of the ring body.

In an embodiment, the distribution density increases exponentially.

In an embodiment, the light incident portion is an angular portion with an angle equal to or larger than 60 degrees and less than 90 degrees.

In an embodiment, a normal to the light incident surface is substantially parallel to a tangent of the ring body corresponding to the light incident surface.

In an embodiment, the ring body is a circular ring body; the at least one light incident portion is disposed on the ring body symmetrically with respect to a center of the circular ring body.

In an embodiment, on the plane where the light incident surface lies, the light incident surface has a size larger than a size of a cross section of the ring body.

In an embodiment, the ring body includes two linear portions and two curved portions; the two linear portions are parallel to each other, and the two curved portions are connected between the two linear portions to form a closed ring body. The at least one light incident portion is disposed on at least one of the two linear portions, and a normal to the light incident surface is substantially parallel to an extension direction of the linear portion.

In an embodiment, the at least one light incident portion includes at least one pair of light incident portions which are correspondingly disposed on the two linear portions, respectively.

In an embodiment, the plurality of optical structures disposed on the linear portions are arranged in multiple rows parallel to the extension direction of the linear portions, and a connection line of adjacent optical structures of adjacent rows includes an angle of 60 degrees with the extension direction of the linear portion.

It is another object of the invention to provide a light source module, which includes the ring light guide described above to achieve a uniform distribution of brightness with a reduced amount of light sources and further to reduce the maintenance cost of replacing the light sources.

In an embodiment, the invention provides a light source module including the ring light guide described above, at least one light source disposed corresponding to the at least one light incident portion, a reflector, and a diffuser, the light source providing a light into the ring light guide from the light incident surface, the plurality of optical structures guiding the light along the extension direction of the ring body to emit out of the ring body from the light exit surface, the reflector disposed on the bottom surface of the ring body to reflect the light toward the light exit surface, the diffuser disposed on the light exit surface to homogenize the light emitted from the light exit surface.

In an embodiment, the light source module further includes a lens disposed on the diffuser to guide the light emitted from the diffuser.

Compared with the prior art, the ring light guide and the light source module of the invention have a light incident direction corresponding to the extension direction of the ring light guide, so as to achieve cost optimization and uniformity of light by reduced amount of light sources. Moreover, when the light sources in the light source module of the invention have to be replaced, the time for replacement and the maintenance cost can be decreased since the number of light sources is reduced.

BRIEF DESCRIPTION OF THE DRAWINGS

FIG. 2 is a schematic view of the arrangement of the optical structures in an embodiment of the invention.

FIG. 2A is a partially enlarged view of FIG. 2.

FIG. 3 is a schematic view of the arrangement of the optical structures in another embodiment of the invention.

DETAILED DESCRIPTION OF THE PREFERRED EMBODIMENT

The invention provides a ring light guide and a light source module to provide a different lighting pattern and an uniform ring-shaped lighting. Specifically, the ring light guide of the invention can be applied to a light source module to provide a ring-shaped lighting. The light source module of the invention can be an independent lamp device or can be integrated with other devices as a light source module that provides a ring-shaped light. Hereinafter, embodiments of the ring light guide and the light source module of the invention will be described in detail with reference to the drawings.

Figure 1:
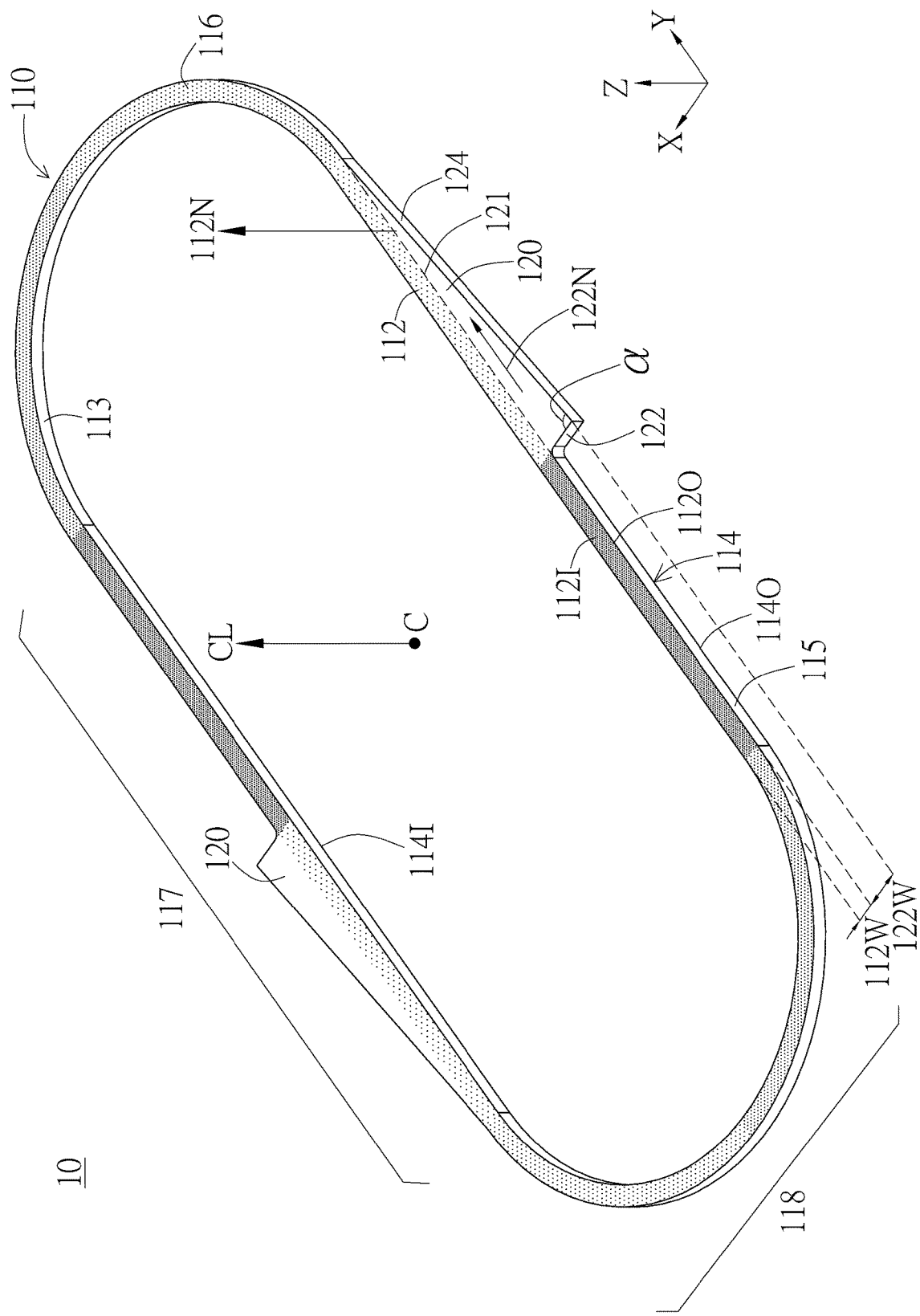
FIG. 1 is a schematic view of the ring light guide in an embodiment of the invention.

FIG. 1 is a schematic view of the ring light guide in an embodiment of the invention. As shown in FIG. 1, the ring light guide 10 includes a ring body 110 and at least one light incident portion 120. The ring body 110 has a light exit surface 112 and a bottom surface 114. The light exit surface 112 and the bottom surface 114 are two opposite ring surfaces of the ring body 110. The ring body 110 has a plurality of optical structures 116 disposed along the ring body 110. The light incident portion 120 is disposed on the ring body 110 and protrudes from a lateral side of the ring body 110. The light incident portion 120 has a light incident surface 122, and a plane where the light incident surface 122 lies crosses a plane where the light exit surface 112 lies.

Specifically, the ring body 110 can be made of any suitable optical materials, such as poly(methyl methacrylate) (PMMA), poly carbonate (PC), but not limited thereto. The ring body 110 is preferably a closed ring body, i.e., the ring body 110 is not opened with free ends. The ring body 110 has the light exit surface 112, the bottom surface 114, an inner lateral surface 113, and an outer lateral surface 115. The light exit surface 112 and the bottom surface 114 extend in the same direction and are disposed opposite to each other, so that the normal direction (e.g. 112N) of the light exit surface 112 and the bottom surface 114 is substantially parallel to the virtual axis CL that passes through the ring center C. For example, the light exit surface 112 and the bottom surface 114 are the upper ring surface and the lower ring surface of the ring body 110, which are arranged opposite to each other along the Z axis and extend along the XY plane. The light exit surface 112 and the bottom surface 114 have inner rims (e.g. 112I, 114I) and outer rims (e.g. 112O, 114O) along the ring body 110, which are arranged opposite to each other in the radial direction (or the ring thickness direction). In other words, the inner rim 112I of the light exit surface 112 and the inner rim 114I of the bottom surface 114 are located at the inner side of the ring body 110 in the ring thickness direction, and the outer rim 112O of the light exit surface 112 and the outer rim 114O of the bottom surface 114 are located at the outer side of the ring body 110 in the ring thickness direction. The inner lateral surface 113 and the outer lateral surface 115 are disposed opposite to each other in the radial direction (or the ring thickness direction) of the ring body 110, so that the inner lateral surface 113 is connected between the inner rim 112I of the light exit surface 112 and the inner rim 114I of the bottom surface 114, and the outer lateral surface 115 is connected between the outer rim 112O of the light exit surface 112 and the outer rim 114O of the bottom surface 114. In an embodiment, the light exit surface 112 and the bottom surface 114 substantially have the same shape and size, so that the inner lateral surface 113 and the outer lateral surface 115 are respectively connected to the inner rims 112I, 114I and the outer rims 112O, 114O of the light exit surface 112 and the bottom surface 114 along a direction substantially parallel to the normal direction 112N (or virtual axis CL) of the light exit surface 112 and the bottom surface 114. In other words, the distance between the inner lateral surface 113 and the outer lateral surface 115 are substantially the thickness of the ring body 110 or the width of the light exit surface 112 (e.g. 112W).

Moreover, the ring body 110 can be a closed ring body having any suitable shape, such as circular, elliptical, rectangular, triangular, polygonal, or other geometric shape. For example, as shown in FIG. 1, the ring body 110 includes two linear portions 117 and two curved portions 118. The two linear portions 117 are parallel to each other, and the two curved portions 118 are connected between the two linear portions 117 to form a closed ring body having an elliptical or rounded oblong shape.

The light incident portion 120 is preferably integrally formed with the ring body 110, so that the light incident portion 120 protrudes from the lateral side of the ring body 110. In an embodiment, the light incident portion 120 is preferably formed of the same material as the ring body 110, but not limited thereto. According to practical applications, the light incident portion 120 and the ring body 110 can be formed of the same material or different materials. As shown in FIG. 1, the light incident portion 120 is a protrusion, which extends outward from the outer lateral surface 115 of the ring body 110, but not limited thereto. In another embodiment (not shown), the light incident portion 120 can extend inward from the inner lateral surface 113 of the ring body 110. In other words, the light incident portion 120 is a portion of the ring light guide 10 that extends outward or inward with respect to the ring body 110 along the radial direction (or the ring thickness direction) of the ring body 110. According to practical applications (based on such as the size or shape of the ring body 110), the ring light guide 10 can include one or more light incident portions 120, and the plurality of light incident portions 120 are preferably disposed on the ring body 110 at intervals, so that light entering the light incident portions 120 can be guided by the ring body 110 to be uniformly emitted out from the light exit surface 112. In this embodiment, the ring light guide 10 includes two light incident portions 120, and the two light incident portions 120 are correspondingly disposed on the two linear portions 117, respectively. For example, the two light incident portions 120 are symmetrically arranged with respect to the ring center C, but not limited thereto.

The light incident portion 120 is preferably an angular portion with an angle α, which is equal to or larger than 60 degrees and less than 90 degrees (i.e., 60≤α<90 degrees). Specifically, the cross section of the light incident portion 120 on a plane parallel to the extension plane of the light exit surface 112 (e.g. XY plane) can have a triangular or triangle-like shape. One side of the light incident portion 120 (e.g. the connection side 121) is connected to the outer lateral surface 115 of the ring body 110, so that the corner corresponding to the connection side 121 includes the angle α of the light incident portion 120. For example, as shown in FIG. 1, the connection side 121 of the light incident portion 120 is parallel to the extension direction of the linear portion 117 and connected to the linear portion 117, so that two surfaces of the light incident portion 120 (e.g. the light incident surface 122 and the inclined surface 124) are connected to two opposite ends of the connection side 121 and extend outward toward each other, so as to be connected to each other to form the angle α. In other words, the light incident surface 122 and the inclined surface 124 include the angle α therebetween, and the angle α is preferably equal to or larger than 60 degrees and less than 90 degrees. Specifically, the light incident surface 122 is connected to one end of the connection side 121 and extend along the radial direction (or the ring thickness direction) of the ring body 110, and the inclined surface 124 is connected to the light inclined surface 122 and extend inclinedly to connect the other end of the connection side 121, so that the angle α included between the light incident surface 122 and the inclined surface 124 is preferably equal to or larger than 60 degrees and less than 90 degrees. In this embodiment, the light incident portion 120 is disposed on the linear portion 117, so that the normal 122N to the light incident surface 122 is substantially parallel to the extension direction of the linear portion 117. For example, the light incident surface 122 is a surface of the light incident portion 120 that extends along the XZ plane, and the plane where the light incident surface 122 lies (e.g. XZ plane) is preferably perpendicular to the plane where the light exit surface 112 lies (e.g. XY plane), so that the normal 122N to the light incident surface 122 (e.g. Y axis direction) is substantially parallel to the extension direction of the linear portion 117 (e.g. Y axis direction) and perpendicular to the normal 112N to the light exit surface 112 (e.g. Z axis direction).

Moreover, on the plane where the light incident surface 122, the light incident surface 122 has a size larger than a size of a cross section of the ring body 110. For example, as shown in FIG. 1, on the XZ plane where the light incident surface 122 lies, the light incident surface 122 has a width 122W along the X axis direction, which is preferably larger than the width 112W of the cross section of the ring body 110 in the X axis direction, so that the light incident surface 122 has a relatively larger area to improve the light incident efficiency, but not limited thereto. In another embodiment (not shown), on the XZ plane where the light incident surface 122 lies, the light incident surface 122 has a length along the Z axis direction, which is preferably larger than the length of the cross section of the ring body 110 in the Z axis direction (i.e., the distance between the light exit surface 112 and the bottom surface 114), so that the light incident surface 122 can have a relatively larger area to improve the light incident efficiency. In other words, according to the size and light-emitting angle of the light source, the light incident surface 122 can have a size larger than the light exit surface 112 in one dimension (e.g. X axis, or Z axis) or two dimensions (e.g. X axis and Z axis) of the extension plane, so as to improve the light incident efficiency.

The plurality of optical structures 116 can be disposed along the ring body 110 by screen printing, laser engraving or optical doping. For example, in an embodiment, the plurality of optical structures 116 can be formed on the bottom surface 114 or the light exit surface 112 of the ring body 110 by screen printing or laser engraving, but not limited thereto. In another embodiment, the plurality of optical structures 116 can be formed in the ring body 110 by doping optical particles during the formation of the ring light guide 10. In an embodiment, the plurality of optical structures 116 has a distribution density, which preferably increases from the light incident surface 122 along the extension direction of the ring body 110 (e.g. the linear portion 117). Specifically the distribution density of the optical structures 116 preferably increases from the location where the light incident surface 122 is connected along the light traveling direction, so that along the light traveling direction, the closer to the light incident surface 122, the distribution density of the optical structures 116 becomes smaller, and the farther away from the light incident surface 122, the distribution density of the optical structures 116 becomes larger.

Referring to FIG. 2 and FIG. 2A, FIG. 2 is a schematic view of the arrangement of the optical structures in an embodiment of the invention, and FIG. 2A is a partially enlarged view of FIG. 2. As shown in FIG. 2 and FIG. 2A, the plurality of optical structures 116 disposed on the linear portions 117 are arranged in multiple rows parallel to the extension direction 117L of the linear portions 117, and a connection line of adjacent optical structures 116 of adjacent rows (e.g. virtual connection line 116L) includes an angle β of 60 degrees with the extension direction 117L of the linear portions 117. Specifically, the plurality of optical structures 116 are arranged in multiple rows along the ring thickness direction of the linear portion 117 (e.g. the X axis direction), and the optical structures 116 in each row are disposed at intervals along the extension direction 117L or the normal 122N to the light incident surface 122 (e.g. Y axis direction). The angle β is preferably included between the virtual connection line 116L of correspondingly adjacent optical structures 116 in multiple rows and the extension direction 117L of the linear portion 117 (or the normal 122N to the light incident surface 122), and the angle β is preferably 60 degrees. In each row, the interval between adjacent optical structures can be determined by the attenuation rate of the light source. For example, fora dot-shaped optical structure 116 with a diameter of 0.1 mm, when the material of the ring body 110 is PMMA, and the wavelength of light emitted from the light source is 660 nm, the attenuation rate is about 106 dB/km, i.e., light energy is attenuated about 10^10.6 per kilometer, or 10^6.6 per centimeter. In an embodiment, the distribution density of the optical structures 116 preferably increases exponentially to improve the brightness uniformity, but not limited thereto. In another embodiment, the ring body 110 can be divided into a plurality sections, the distribution density in the section closer to the light incident surface 122 becomes smaller, and the distribution density in the section farther away from the light incident surface 122 becomes larger.

Referring to FIG. 3, FIG. 3 is a schematic view of the arrangement of the optical structures in another embodiment of the invention. As shown in FIG. 3, the plurality of optical structures 116 are disposed in multiple rows along the extension direction of the curved portion 118, and a virtual connecting line of adjacent optical structures 116 of adjacent rows extends along the radial direction of the curved portions 118. In other words, in the curved portion 118, the plurality of optical structures 116 are disposed in multiple rows along the radial direction, and the optical structures 116 in each row are disposed along the extension direction of the curved portion 118, so that the virtual connecting line of adjacent optical structures 116 of adjacent rows extends along the radial direction of the curved portion 118.

Figure 4:
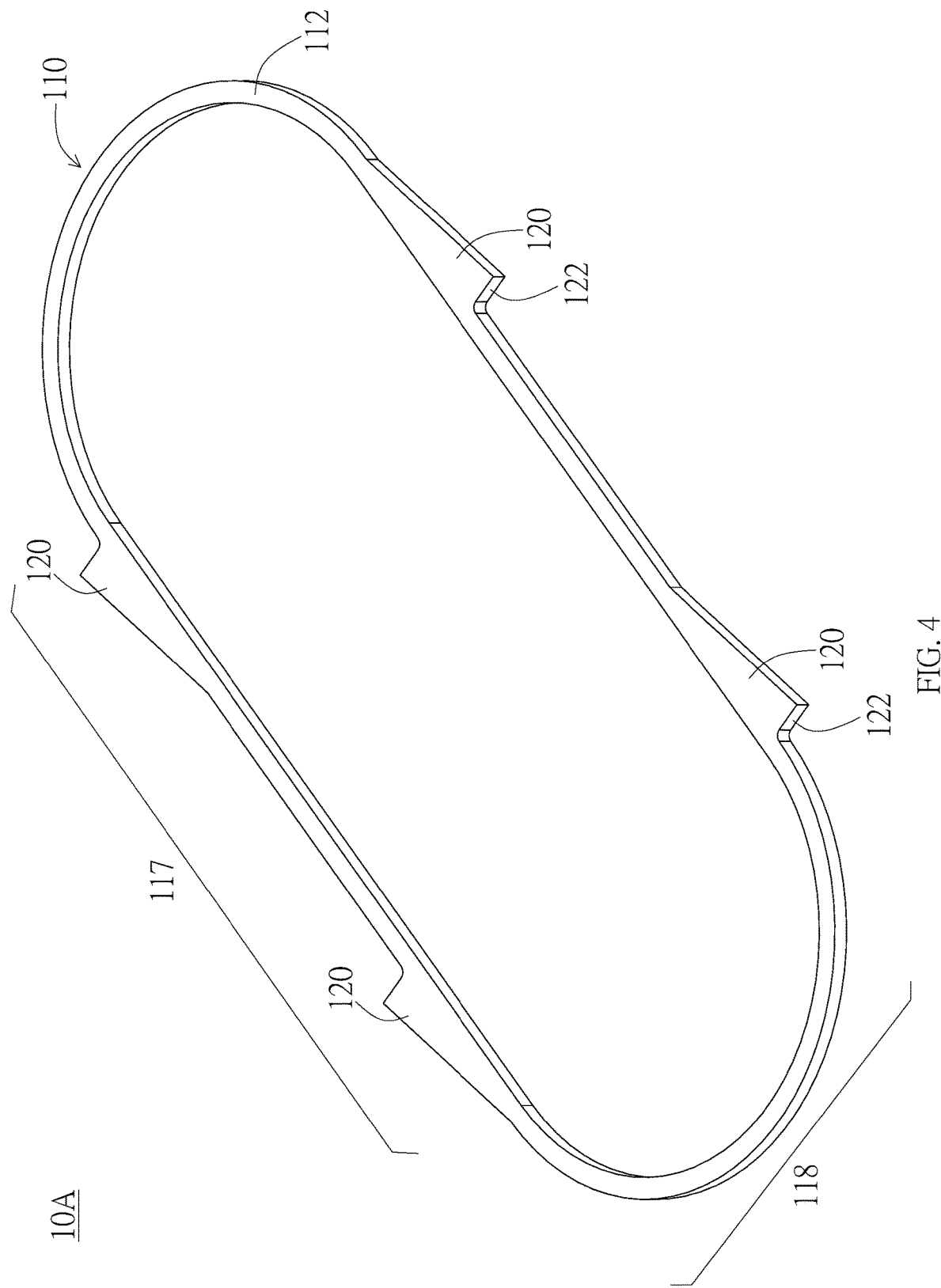
FIG. 4 to FIG. 6 are schematic views of the ring light guide in different embodiments of the invention.

Two light incident portions 120 are illustrated in the above embodiment, but not limited thereto. In another embodiment, as shown in FIG. 4, the ring light guide 10A includes four light incident portions 120, and the four light incident portions 120 are disposed on the two linear portions 117, respectively, so that multiple light incident portions 117 can receive light sequentially along the extension direction of the ring body 110. For example, each linear portion 117 is provided with two light incident portions 120, which are disposed at interval and have the same light incident direction, so that the four light incident portions 120 can receive light sequentially along the counterclockwise extension direction of the ring body 110, but not limited thereto.

Figure 5:
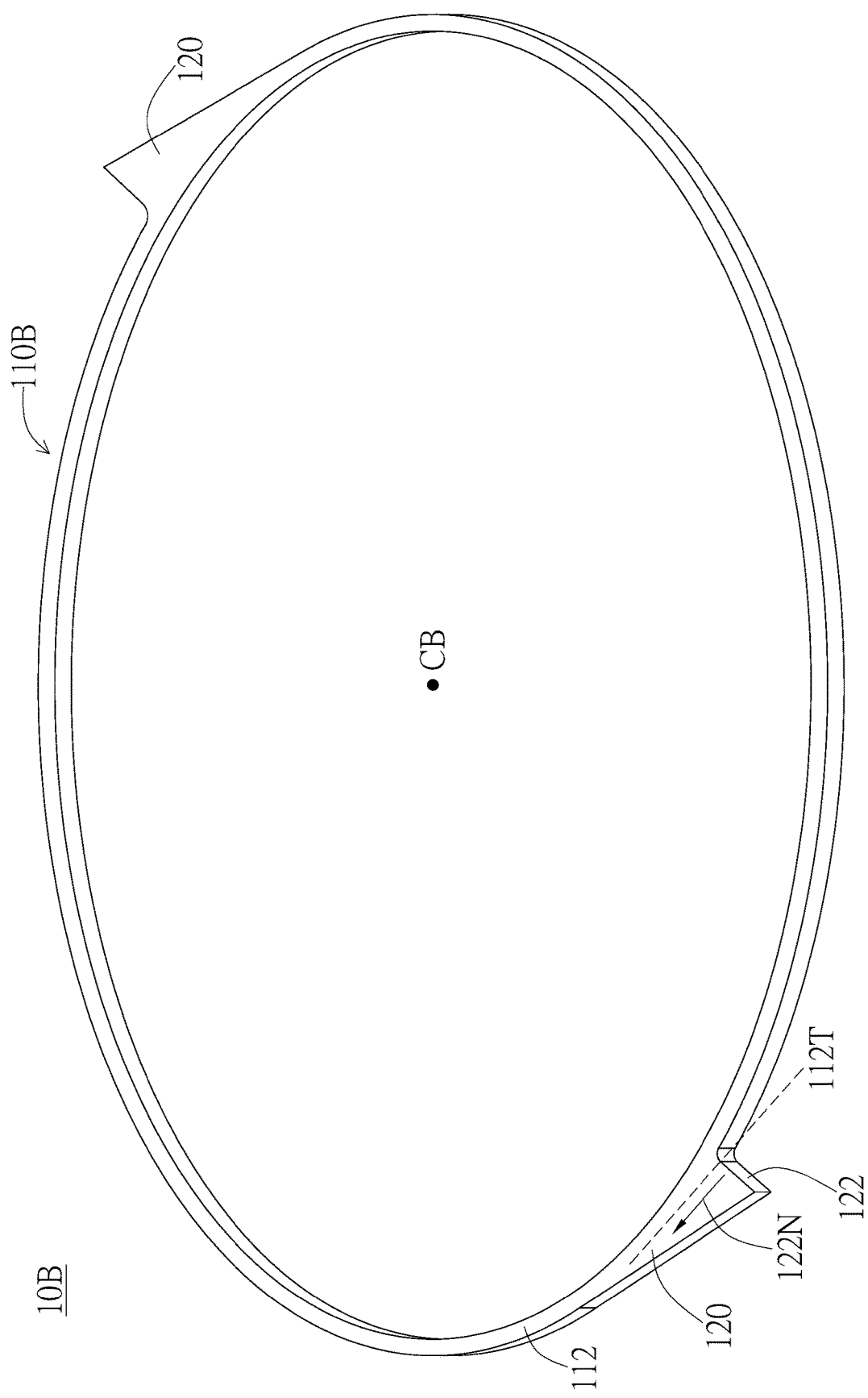

As shown in FIG. 5, in another embodiment, the ring light guide 10B has a circular ring body 110B, and the at least one light incident portion 120 is disposed on the circular ring body 110B symmetrically with respect to the center CB of the circular ring body 110B. For example, two light incident portions 120 are disposed on the circular ring body 110B symmetrically with respect to the center CB of the circular ring body 110B, so that the light incident surfaces 122 of the two light incident portions 120 substantially lie on a same plane (or coplanar), but not limited thereto. When the light incident portion 120 is disposed on the circular ring body 110B or the curved portion 118, the normal 122N to the light incident surface 122 is preferably substantially parallel to the tangent of the ring body 110B corresponding to the light incident surface 122. As shown in FIG. 5, there is a tangent 112T at a point that the light incident surface 122 of the light incident portion 120 and the circular ring body 110B are connected, and the normal 122N to the light incident surface 122 is substantially parallel to the tangent 112T. In other words, the light incident surface 122 substantially extends along the radial direction of the ring body 110B.

Figure 6:
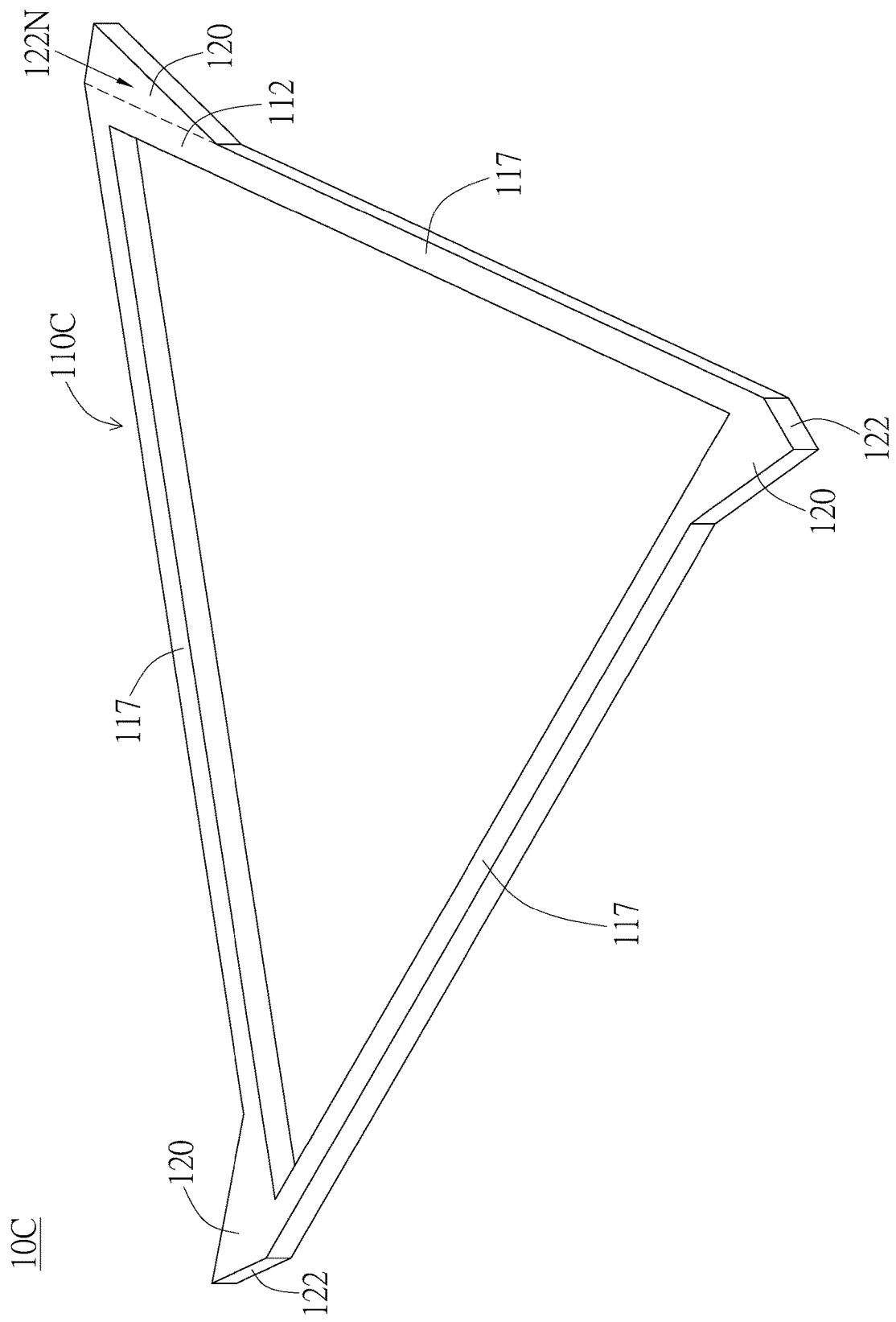

As shown in FIG. 6, in a further embodiment, the ring light guide 110C can include a polygonal ring body 110C, such as triangular ring body, and the normal to the light incident surface 122 of the light incident portion 120 is substantially parallel to the extension direction of a corresponding side. Specifically, the ring body 110C can include multiple linear portions 117, which are connected to form the polygonal ring body, and the light incident portion 120 is disposed on the side of a corresponding linear portion 117, so that the normal 122N to the light incident surface 122 is substantially parallel to the extension direction of the corresponding linear portion 117.

In the embodiments of FIG. 1 and FIGS. 4 to 6, the ring body is illustrated as a closed ring, but not limited thereto. According to practical applications, the ring light guide may include an open ring body. In other words, the ring light guide may include a ring body, which can be formed by linear portions 117, curved portions 118, or a combination of linear portion 117 and curved portion 118 in a closed configuration or an open configuration. According to practical applications, at least one light incident portion 120 can be disposed on the linear portion 117, the curved portion 118, or both. When the light incident portion 120 is disposed on the linear portion 117, the normal 122N to the light incident surface 122 is substantially parallel to the extension direction of the linear portion 117. When the light incident portion 120 is disposed on the curved portion 118, the normal 122N to the light incident surface 122 is substantially parallel to the tangent (e.g. 112T) at the point that the light incident surface 122 is connected to the ring body (e.g. 10B). As such, the light incident direction of the ring light guide corresponds to the extension direction of the ring light guide, so as to achieve cost optimization and uniformity of light by limited number of light sources.

Figure 7A:
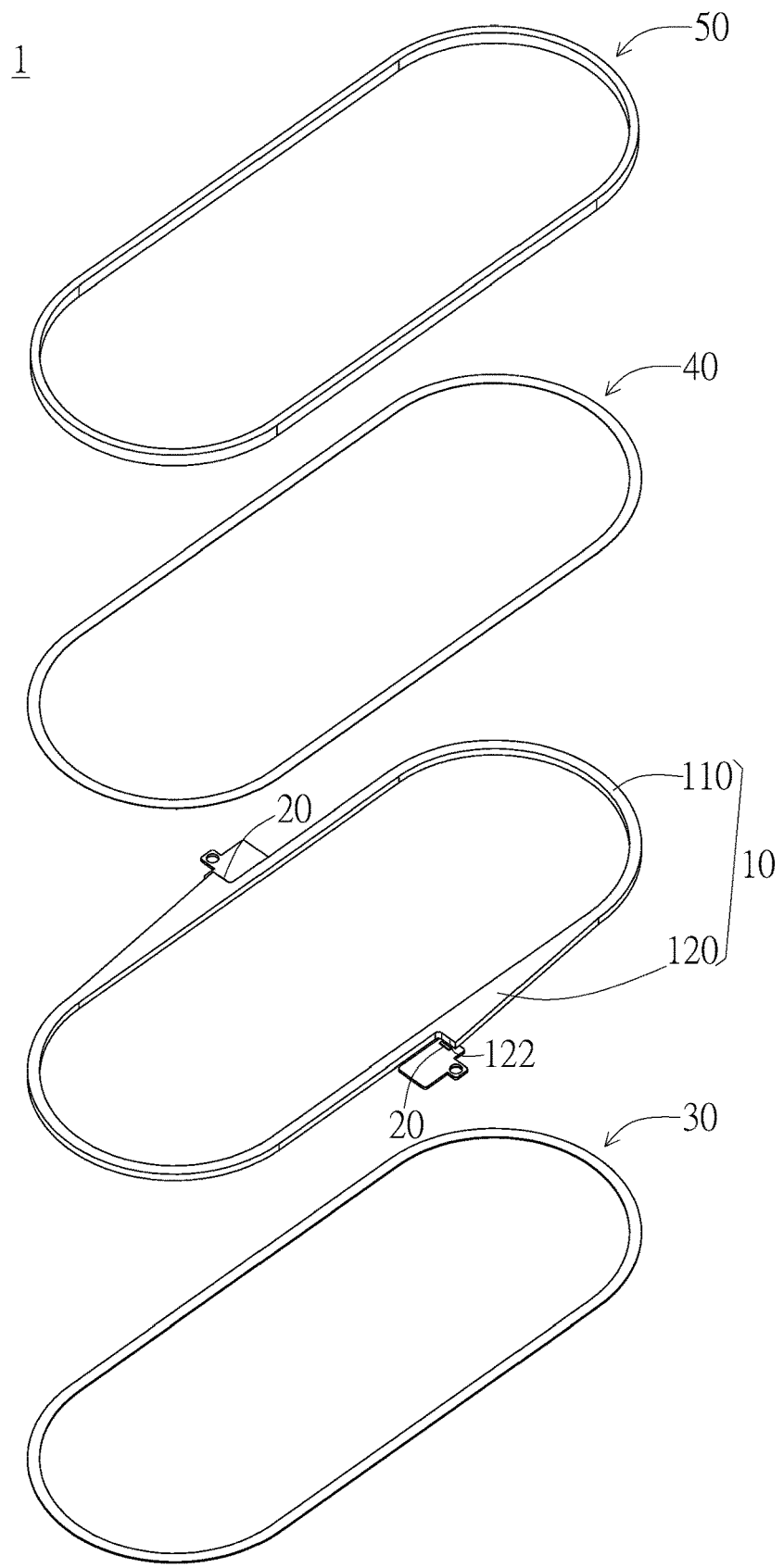
FIG. 7A and FIG. 7B are an exploded view and an assembled view of the light source module in an embodiment of the invention, respectively.
Figure 7B:
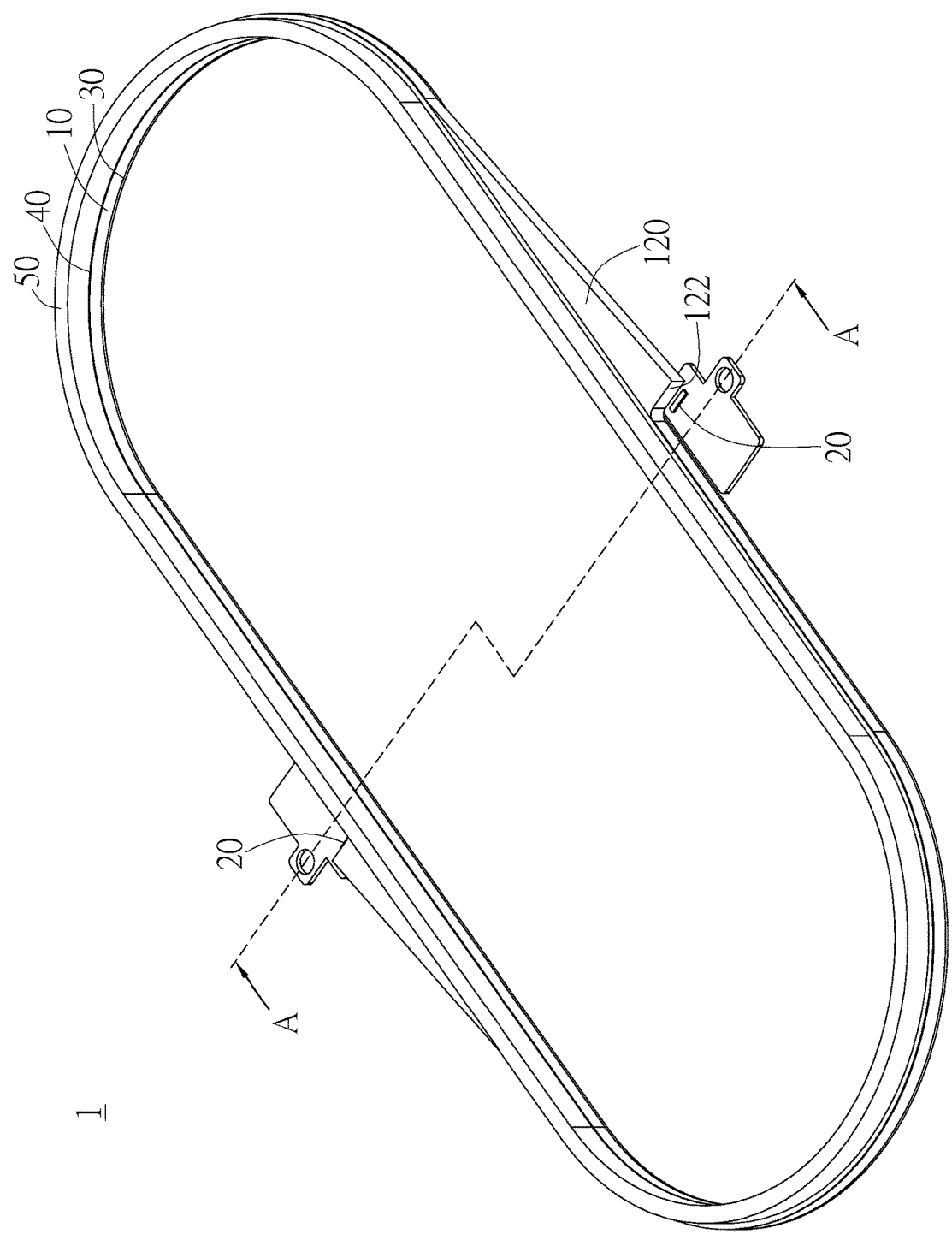
Figure 7C:
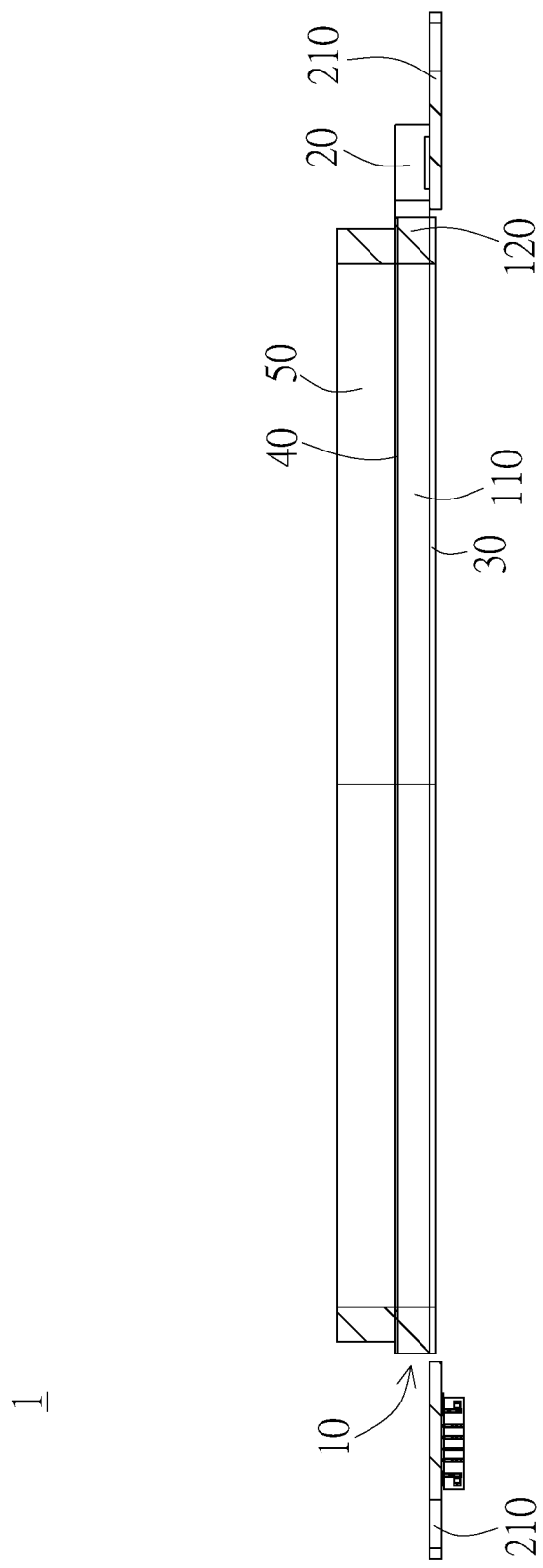
FIG. 7C is a schematic cross-sectional view along the cutting line AA of FIG. 7B.

FIG. 7A and FIG. 7B are an exploded view and an assembled view of the light source module in an embodiment of the invention, respectively, and FIG. 7C is a schematic cross-sectional view along the cutting line AA of FIG. 7B. As shown in FIGS. 7A to 7C, in the embodiment, the light source module 1 includes a ring light guide (e.g. 10), at least one light source 20, a reflector 30, and a diffuser 40. The at least one light source 20 is disposed corresponding to the at least one light incident portion 120 of the ring light guide 10. The light source 20 provides a light into the ring light guide 10 from the light incident surface 122. The plurality of optical structures 116 guide the light along the extension direction of the ring body 110 to emit out of the ring body 110 from the light exit surface 112. The reflector 30 is disposed on the bottom surface 114 of the ring body 110 to reflect the light toward the light exit surface 112. The diffuser 40 is disposed on the light exit surface 112 to homogenize the light emitted from the light exit surface 112. In an embodiment, the light source module 1 further includes a lens 50, which is disposed on the diffuser 40 to guide the light emitted from the diffuser 40.

In this embodiment, the ring light guide 10 of FIG. 1 is illustrated as an example, but not limited thereto. In another embodiment, the ring light guide of the light source module 1 can be any ring light guide (e.g. ring light guide 10, 10A, 10B, 10C) of the embodiments or variants thereof. The light source 20 is preferably a light-emitting diode, which is electrically connected to a light source circuit board 210. The light-emitting surface of the light source 20 preferably faces the light incident surface 122 of the light incident portion 120, and the light incident surface 122 preferably has a surface area larger than that of the light-emitting surface, so that the projection of the light-emitting surface substantially falls within the coverage of the light incident surface 122 to improve the light incident efficiency of the light source 20.

The reflector 30 can be made of any suitable reflective material, such as metal, or a reflective material coated on a non-reflective material (e.g. non-metal). For example, the reflector 30 can be a metal sheet, a non-metal sheet coated with a metal layer, or a reflective layer coated on the bottom surface 114 of the ring body. The diffuser 40 and the lens 50 can have any suitable optical property to promote the lighting uniformity of the light source nodule 1. In an embodiment, the shape of the reflector 30, the diffuser 40, and the lens 50 preferably corresponds to the ring body. In other words, the diffuser 40 and the lens 50 preferably have the same shape and size as the light exit surface 112 of the ring body, so that the light source module 1 can provide uniform ring-shaped light. The reflector 30 preferably has the same shape and size as the bottom surface 114 of the ring body, so as to reflect light emitted from the bottom surface 114 toward the light exit surface 112 to enhance the lighting efficiency.

Figure 8:
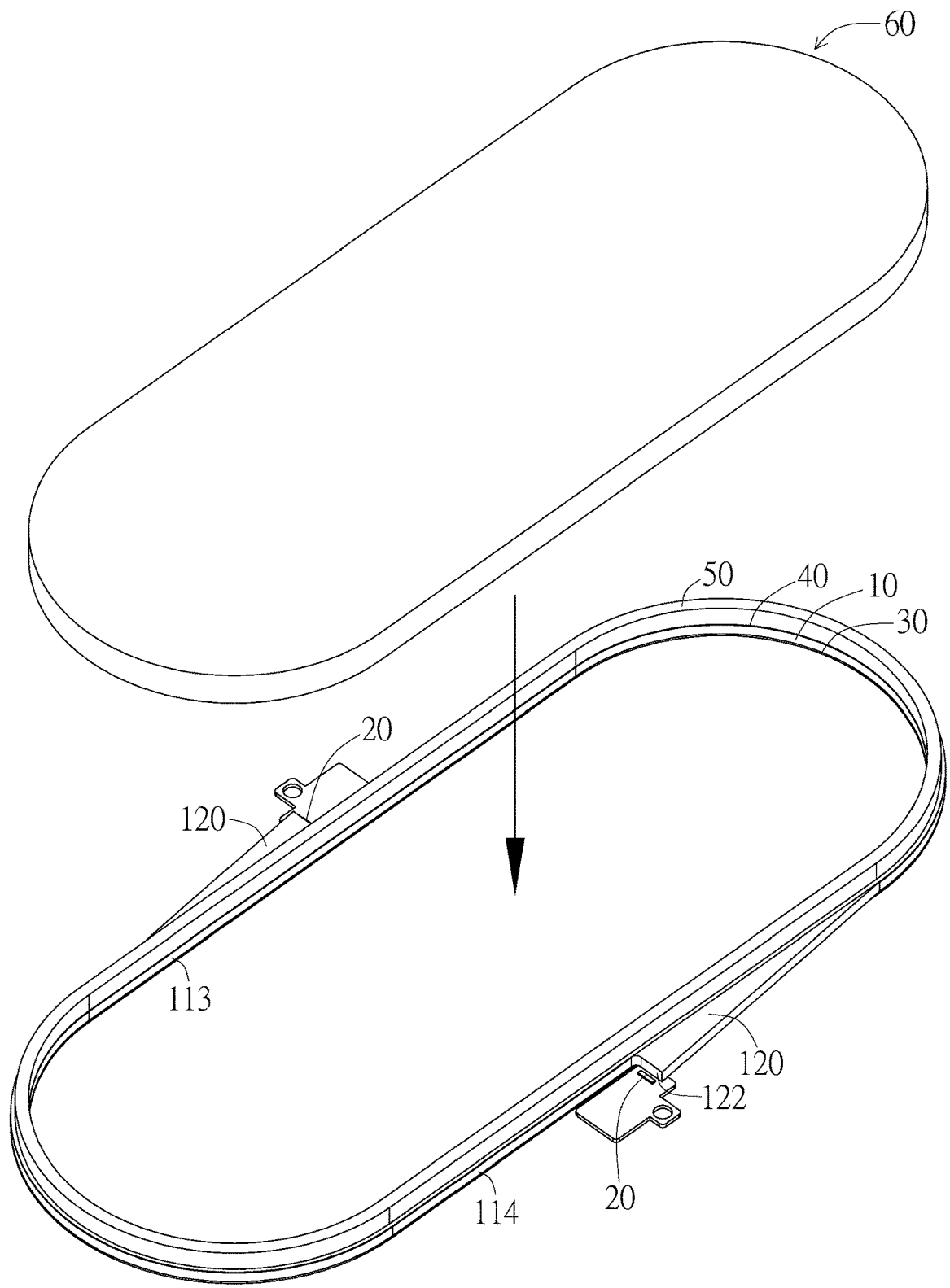
FIG. 8 is a schematic view of the light source module in another embodiment of the invention.

As shown in FIG. 8, in another embodiment, the light source module 1 further includes a shielding member 60. In this embodiment, the shielding member 60 is disposed at the inner side of the ring body 110 of the ring light guide 10 adjacent to the inner lateral surface 113. As such, the shielding member 60 can block light, which is emitted from the inner lateral surface 113 and scatters toward the ring center C, so as to promote the ring-shaped lighting of the light source module 1. The shielding member 60 can be made of non-transmissive material (e.g. black polymer) in a block configuration to be inserted into the inner side of the ring body 110, but not limited thereto. The shielding member 60 can be a film or a coating to be attached or coated to the inner lateral surface 113 of the ring body 110. In another embodiment (not shown), the shielding member 60 is not limited to being disposed on the inner side of the ring body 110. The shielding member 60 can be disposed on the outer side of the ring body 110 adjacent to the outer lateral surface 115, or simultaneously disposed on the inner and outer sides of the ring body 110 respectively adjacent to the inner lateral surface 113 and the outer lateral surface 115, so as to block the light emitted from the inner lateral surface 113 or/and the outer lateral surface 115 of the ring body 110 to further enhance the ring-shaped lighting of the light source module 1.

The light source module of the invention has the light incident surface of the ring light guide corresponding to the extension direction of the ring body, so that the plane where the light incident surface lies crosses the plane where the light exit surface lies (or the normal to the light incident surface is substantially perpendicular to the normal to the light exit surface), and incorporation with the arrangement of the optical structures of the ring body, the light source module of the invention can achieve cost optimization and uniformity of light by a reduced amount of light sources and reduce the maintenance cost of replacing light source.

Although the preferred embodiments of the invention have been described herein, the above description is merely illustrative. The preferred embodiments disclosed will not limit the scope of the invention. Further modification of the invention herein disclosed will occur to those skilled in the respective arts and all such modifications are deemed to be within the scope of the invention as defined by the appended claims.

What is claimed is:

1. A light source module, comprising:
   a ring light guide comprising:
   a ring body having a light exit surface and a bottom surface, the light-exit surface and the bottom surface being two opposite ring-shaped surfaces of the ring body, the ring body having a plurality of optical structures disposed along the ring body, the ring body comprising two linear portions and two curved portions, wherein the two linear portions are parallel to each other, and the two curved portions are connected between the two linear portions to form a closed ring body; and
   at least one light incident portion disposed on at least one of the two linear portions of the ring body, the light incident portion protruding from a lateral side of the ring body and having a light incident surface, wherein a plane where the light incident surface lies crosses a plane where the light exit surface lies, and wherein the plurality of optical structures disposed on the linear portions are arranged in multiple rows parallel to an extension direction of the linear portion, and a connection line of adjacent optical structures of adjacent rows includes an angle of 60 degrees with the extension direction of the linear portion;
   at least one light source disposed corresponding to the at least one light incident portion, the light source providing a light into the ring light guide from the light incident surface, the plurality of optical structures guiding the light along an extension direction of the ring body to emit out of the ring body from the light exit surface;
   a reflector disposed on the bottom surface of the ring body to reflect the light toward the light exit surface;
   a diffuser disposed on the light exit surface to homogenize the light emitted from the light exit surface; and
   a lens disposed on the diffuser to guide the light emitted from the diffuser.

2. The light source module of claim 1, wherein the plurality of optical structures has a distribution density increasing from the light incident surface along the extension direction of the ring body.

3. The light source module of claim 2, wherein the distribution density increases exponentially.

4. The light source module of claim 1, wherein the light incident portion is an angular portion with an angle equal to or larger than 60 degrees and less than 90 degrees.

5. The light source module of claim 1, wherein on the plane where the light incident surface lies, the light incident surface has a size larger than a size of a cross section of the ring body.

6. The light source module of claim 1, wherein a normal to the light incident surface is substantially parallel to the extension direction of the linear portion.

7. The light source module of claim 1, wherein the at least one light incident portion includes at least one pair of light incident portions correspondingly disposed on the two linear portions, respectively.

* * * * *